United States Patent
Boelter et al.

(10) Patent No.: US 6,654,597 B1
(45) Date of Patent: Nov. 25, 2003

(54) SHIRT-POCKET SCANNER

(75) Inventors: Donald A. Boelter, Carmel, IN (US); David A. Lovell, Greenfield, IN (US); Michael E. Shepperd, Lebanon, IN (US)

(73) Assignee: Electra Corporation, Indianapolis, IN (US)

(*) Notice: Subject to any disclaimer, the term of this patent is extended or adjusted under 35 U.S.C. 154(b) by 0 days.

(21) Appl. No.: 09/519,380

(22) Filed: Mar. 3, 2000

Related U.S. Application Data

(60) Provisional application No. 60/170,999, filed on Dec. 15, 1999, and provisional application No. 60/122,885, filed on Mar. 5, 1999.

(51) Int. Cl.⁷ .................................................. H04B 1/16
(52) U.S. Cl. ...................... 455/334; 455/343; 455/572; 455/130
(58) Field of Search ................................. 455/130, 140, 455/572, 343, 333, 334, 161.1, 164.1, 573

(56) References Cited

U.S. PATENT DOCUMENTS

| | | | |
|---|---|---|---|
| 5,163,161 A | * 11/1992 | Bowles et al. | 455/164.1 |
| 5,822,686 A | * 10/1998 | Lundberg et al. | 455/161.3 |
| 5,946,635 A | * 8/1999 | Dominguez | 455/558 |
| 6,225,898 B1 | * 5/2001 | Kamiya et al. | 340/505 |
| 6,421,389 B1 | * 7/2002 | Jett et al. | 375/256 |

* cited by examiner

Primary Examiner—Vivian Chin
Assistant Examiner—John J Lee
(74) Attorney, Agent, or Firm—Barnes & Thornburg

(57) ABSTRACT

A radio includes a receiver circuit, a microprocessor, an input/output (I/O) port, at least one switch for configuring the I/O port, an audio amplifier coupled to the receiver circuit and to the I/O port, an audio frequency transducer coupled to the I/O port, and a power supply coupled to the I/O port, the receiver, the microprocessor, the at least one switch, and the audio amplifier. The at least one switch is coupled to the microprocessor. The audio frequency transducer is selectively coupled to the audio amplifier through the I/O port and the power supply is selectively coupled to the I/O port to permit activation of the audio frequency transducer by a signal coupled from the audio amplifier through the I/O port and to provide access to the power supply through the I/O port.

11 Claims, 7 Drawing Sheets

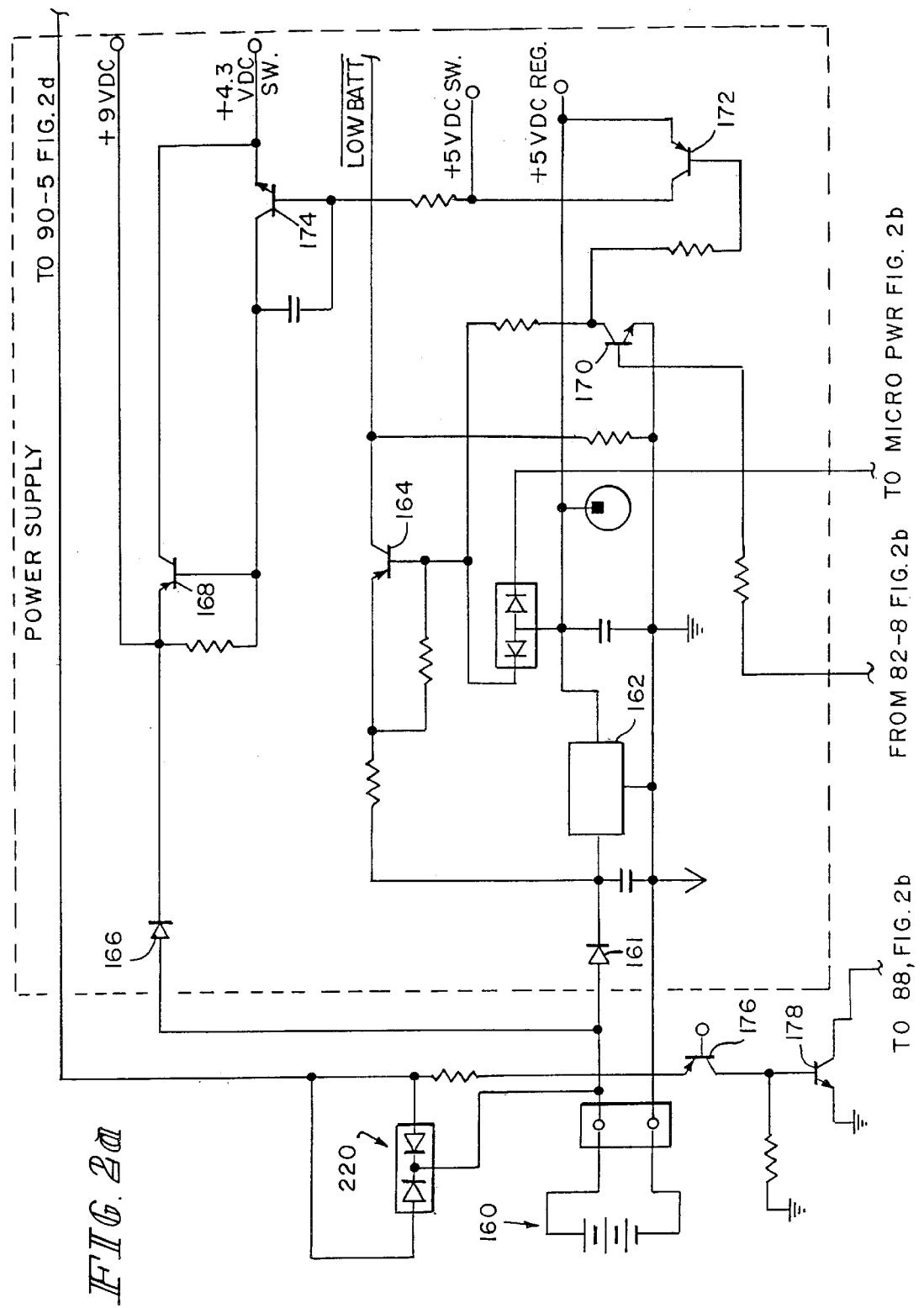

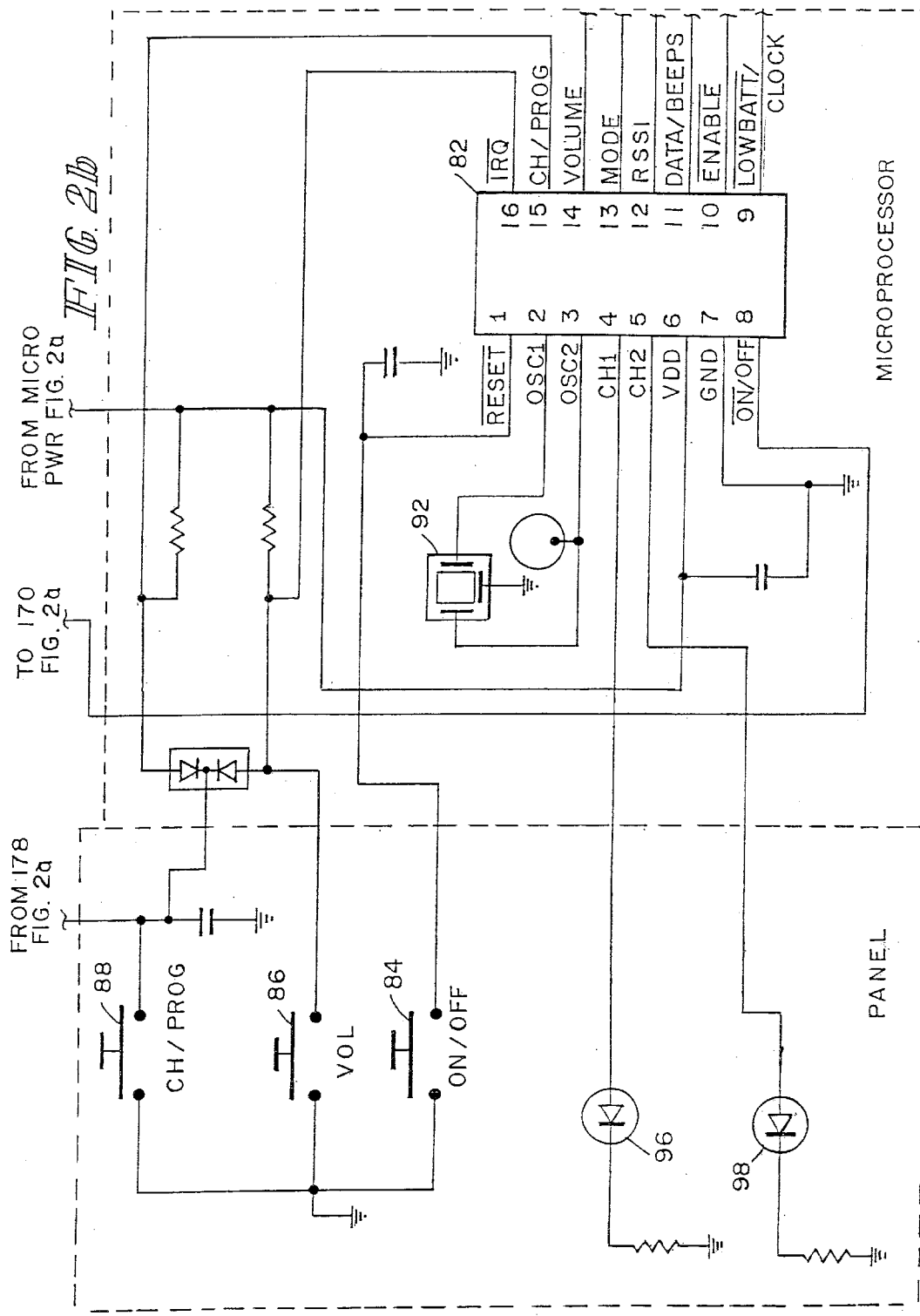

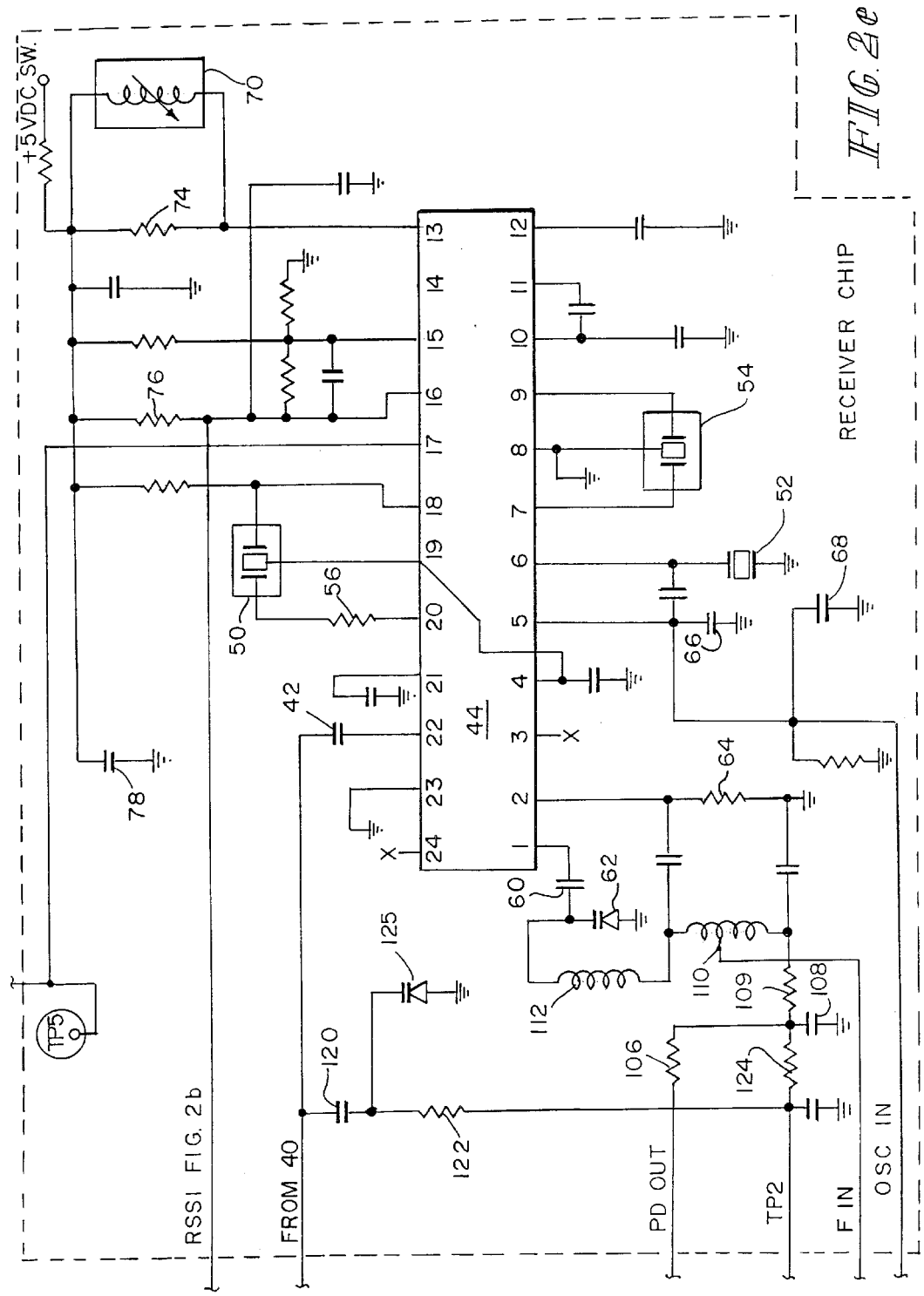

SHIRT-POCKET SCANNER

CROSS REFERENCE TO RELATED APPLICATION

This is a regular utility patent application claiming the benefit of the filing date of U.S. Ser. No. 60/170,999 filed Dec. 15, 1999 and claiming the benefit of the filing date of U.S. Ser. No. 60/122,885 filed Mar. 5, 1999.

FILED OF THE INVENTION

This invention relates to scanning radio receivers, and more particularly to a miniature scanning radio.

A number of signal seeking- or scanning radio receivers are known.

BACKGROUND OF THE INVENTION

There are, for example, the scanning radios such as the AOR model AR 1000 XLT, Uniden model BC235 XLT, Radio Shack PRO-43, and so on.

The invention may best be understood by referring to the following detailed description and accompanying drawings which illustrate the invention. In the drawings:

DETAILED DESCRIPTION OF ILLUSTRATIVE EMBODIMENTS

Figure 1:
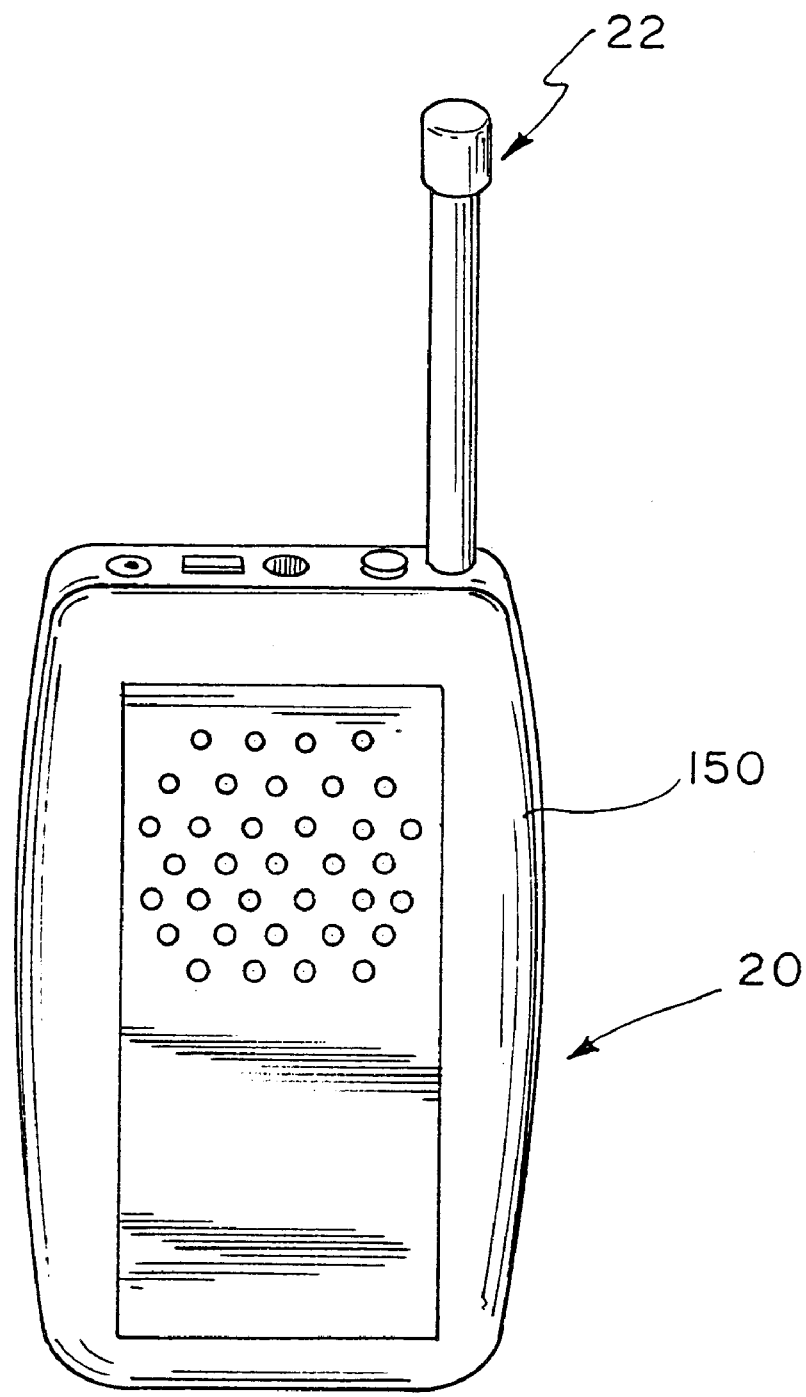
FIG. 1 illustrates a front elevational view of a scanning radio receiver constructed according to the invention; and, FIG. 2 illustrates a partly block and partly schematic diagram of the circuitry of the scanning radio receiver illustrated in FIG. 1.
Figure 2:
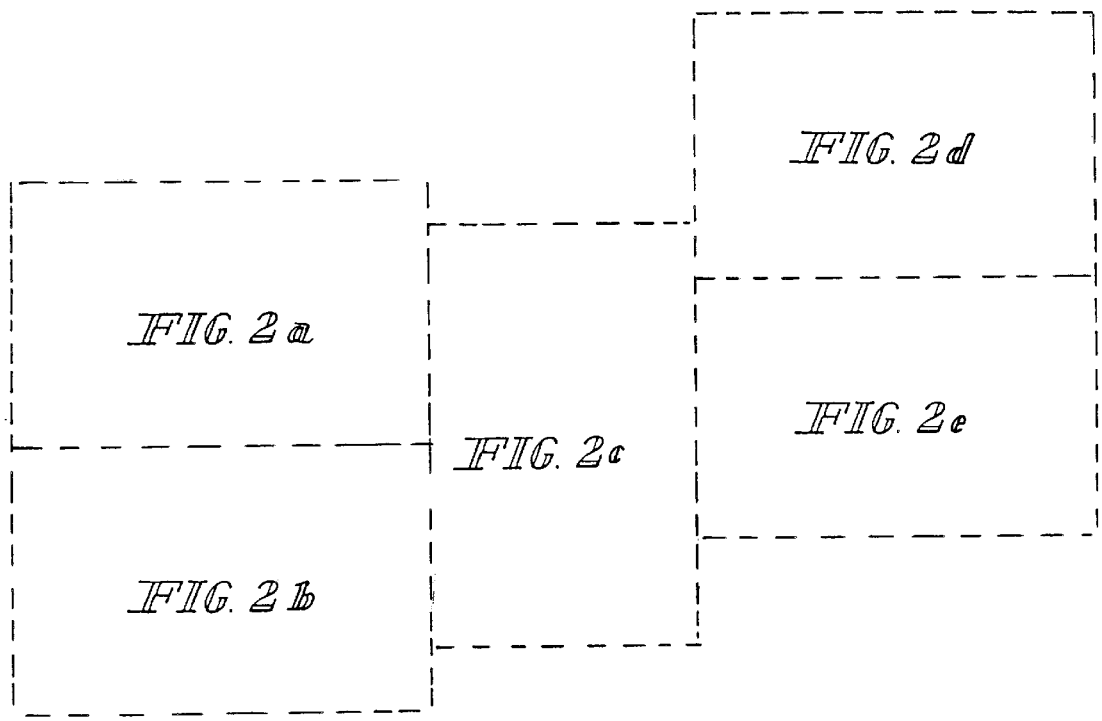
Figure 2C:
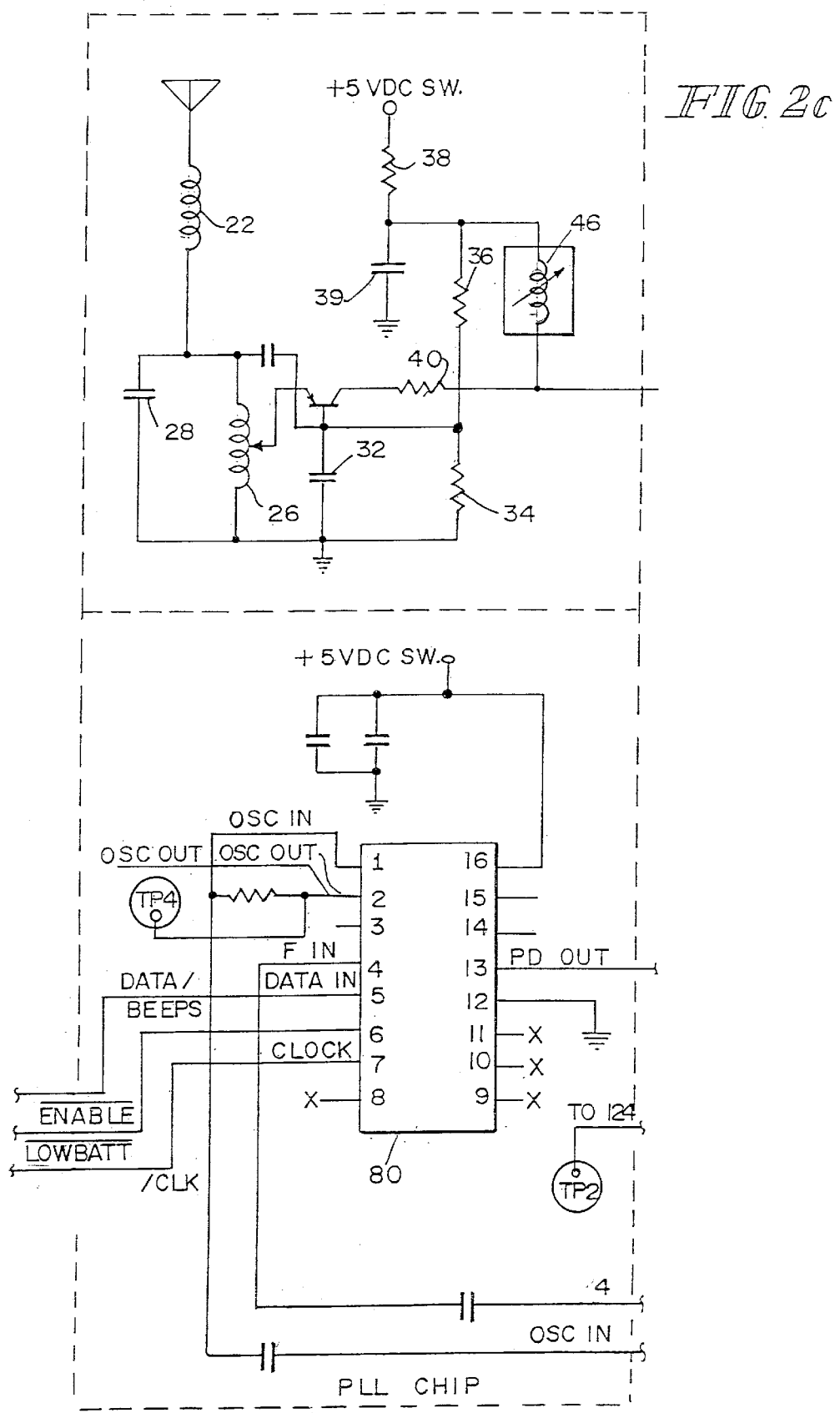
Figure 2D:
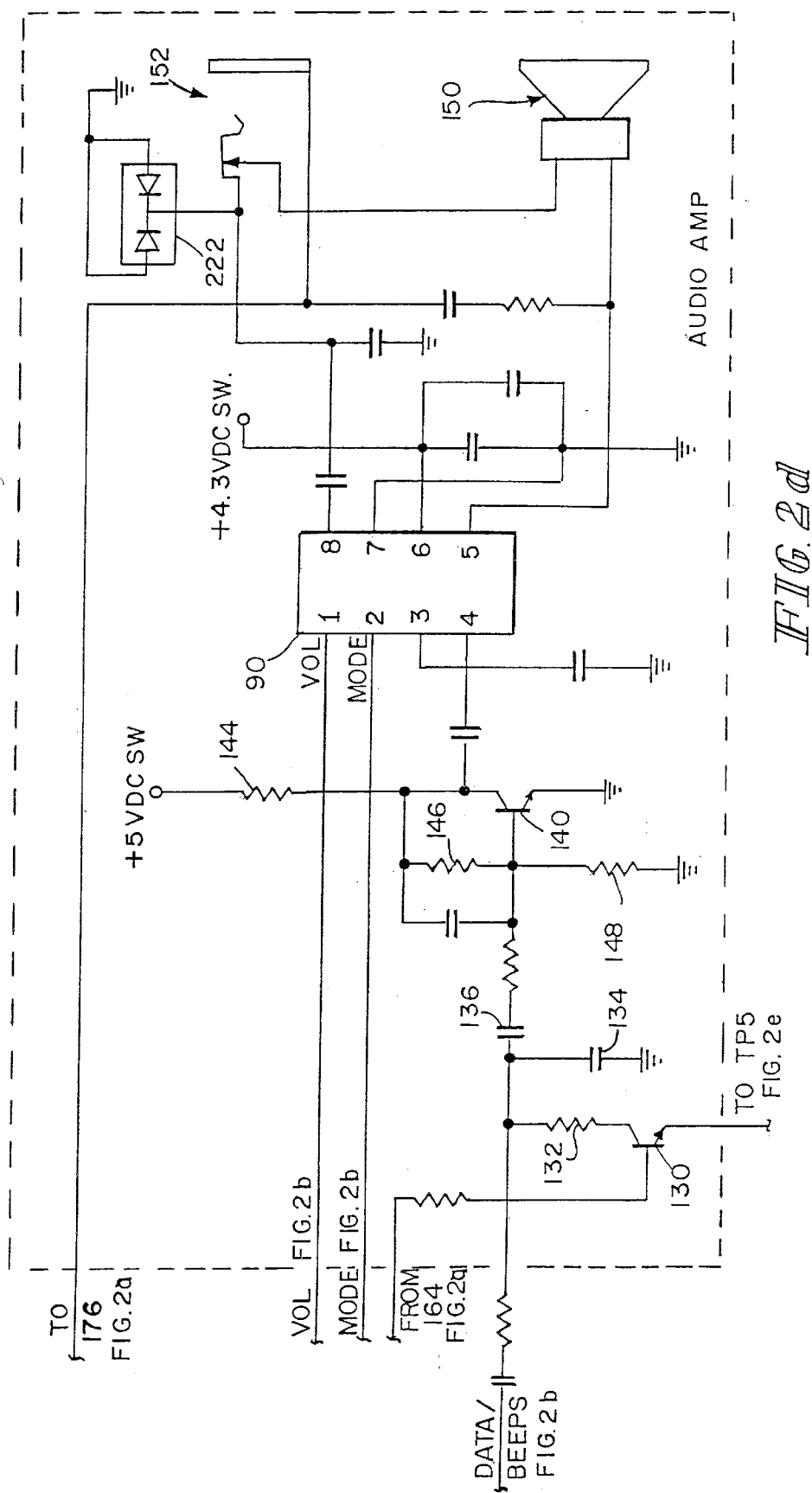

In the detailed descriptions that follow, several integrated circuits and other components are identified, with particular circuit types and sources. In many cases, terminal names and pin numbers for these specifically identified circuit types and sources are noted. This should not be interpreted to mean that the identified circuits are the only circuits available from the same, or any other, sources that will perform the described functions. Other circuits are typically available from the same, and other, sources which will perform the described functions. The terminal names and pin numbers of such other circuits may or may not be the same as those indicated for the specific circuits identified in this application.

Turning now to the drawings, a scanning radio receiver, or scanner, 20 includes a built-in wire antenna 22 coupled to a tuned parallel LC circuit including a 12 nH inductor 26 and a 68 pF capacitor 28 to the receiver ground. The emitter of a transistor 30, which illustratively is a type MMBR941LT1 transistor, is coupled to a tap on inductor 26. Inductor 26 illustratively is formed by etching it on a metal film provided on a printed circuit board on which the scanner 20 circuitry is provided. The base of transistor 30 is coupled through a parallel circuit including a 1 nF capacitor 32 and a 4.7 KΩ resistor 34 to ground and through series 10 KΩ and 1 KΩ resistors 36, 38, respectively, to the receiver VEE supply. A 1 nF capacitor 39 is coupled between the common terminal of resistors 36, 38 and ground. The collector of transistor 30 is coupled through a 100 Ω resistor 40 and 1 nF capacitor 42 in series to an input terminal, pin 22, of an integrated circuit radio receiver chip 44. The common terminal of resistor 40 and capacitor 42 is also coupled through a tunable 25 nH inductor 46 to the common terminal of resistor 38 and capacitor 39.

Receiver chip 44 is provided with 10.7 MHZ and 455 KHz crystal filters 50 and 54, respectively. Crystal filter 50 is coupled to pin 18 and, via a series 2.7 KΩ resistor 56, to pin 20 of receiver chip 44. A 10.245 MHZ crystal 52 is coupled between pin 6 of receiver chip 44 and ground. Crystal filter 54 is coupled across pins 7 and 9 of receiver chip 44. Pin 1 of chip 44 is coupled through a series 100 pF capacitor 60 and varactor diode 62 to ground. Pin 2 of chip 44 is coupled through a 3.3 KΩ resistor 64 to ground. Pin 4 of chip 44 is coupled through a 0.1 µF capacitor to ground. Pin 5 of chip 44 is coupled through the parallel combination of a 56 pF capacitor 66, a 5.5 pF~20 pF variable capacitor 68, and a 3.3 KΩ resistor to ground. Pin 8 of chip 44 is coupled to ground. Pin 5 is also coupled to pin 6 through a 47 pF capacitor 69. Pins 10 and 12 of receiver chip 44 are coupled through respective 0.1 µF capacitors to ground. Pin 15 of receiver chip 44 is coupled through a 0.1 µF capacitor and 100 KΩ resistor in parallel to pin 16. Pin 15 is coupled through a 39 KΩ resistor to ground. Pin 21 of receiver chip 44 is coupled through a 0.1 µF capacitor to ground. Pin 23 of receiver chip 44 is coupled to ground. A 47 pF capacitor is coupled between pins 5 and 6 of chip 44. A 0.1 µF capacitor is coupled between pins and 11 of chip 44.

A 455 KHz filter including a variable inductor 70 and a 68 KΩ resistor 74 in parallel is coupled between pins 13 and 15 of receiver chip 44. The pin 15 side of this circuit is coupled to VEE through a 100 Ω resistor and to ground through a 100 µF, 10 VDC capacitor. Pin 16 of receiver chip 44 is also coupled to the pin 15 side of this circuit through a 33 KΩ resistor 76. The common terminal of elements 70, 72, 74, 76 is coupled to ground through a 0.1 µF capacitor 78. Pin 19 of receiver chip 44 is also coupled to this point. Pin 18 of receiver chip 44 is coupled through a 3.3 KΩ resistor to this point. Receiver chip 44 illustratively is a Motorola type MC13136DW type receiver chip. Varactor diode 62 illustratively is a type MMBV409LT1 varactor diode.

An integrated circuit phase locked loop chip (PLL) 80 tunes the receiver chip 44 under the control of a microprocessor chip (µP) 82. All tuning instructions and the like are provided through three pushbutton switches 84, 86, 88. Switch 84 is the scanner 20 ON/OFF switch. It momentarily couples the notRESET terminal of µP 82 to ground to activate the scanner 20. Switch 86 is the VOLUME control for an integrated circuit audio amplifier chip 90 in the scanner 20. Switch 86 momentarily couples the notIRQ terminal of µP 82 to ground to change the audio amplifier's volume. A 4 MHZ resonator 92 coupled across the OSCillator 1 and OSC 2 terminals of µP 82 provides the clock signals for µP 82. Scanner 20 status is indicated by two LEDs 96, 98 the anodes of which are coupled to the emitters of respective transistors 100, 102 and the cathodes of which are coupled through respective 1 KΩ resistors to ground. The collectors of transistors 100, 102 are coupled to the scanner +9 VDC power supply. The base of transistor 100 is coupled to the CHannel 1 terminal of µP 82. The base of transistor 102 is coupled to the CH 2 terminal of µP 82. Transistors 100, 102 illustratively are type MMBT4124 transistors.

The notENABLE terminal of µP 82 is coupled to the notENABLE terminal of PLL 80. The not(LOWBATT/CLOCK) terminal of µP 82 is coupled to the CLOCK terminal of PLL 80. The DATA/BEEPS terminal of µP 82 is coupled to the DATA IN terminal of PLL 80. The PhaseDetector OUTput terminal of PLL 80 is coupled through the series combination of a 5.6 KΩ resistor 106 and a 0.1 µF capacitor 108 to ground. The common terminal of resistor 106 and capacitor 108 is coupled through the series combination of a 68 KΩ resistor 109, a 22 nH inductor 110 and a 5 nH inductor 112 to the common terminal of capacitor 60 and varactor diode 62. Inductors 110, 112 illustratively are also formed by etching them on the metal film of the printed circuit board on which the scanner 20 circuitry is provided.

Feedback is provided to pin 4 of the PLL 80 from a center tap of inductor 110 through a 1 nF capacitor. The common terminal of resistor 40 and capacitor 42 is coupled through a series 1 nF capacitor 120, 100 KΩ resistor 122, and 2.7 KΩ resistor 124 to the common terminal of resistors 106 and 109. The common terminal of capacitor 120 and resistor 122 is coupled through a varactor diode 125 to ground. The common terminal of resistors 122 and 124 is coupled through a 2.2 $\mu$F, 50 VDC capacitor to ground. The DiS-Criminator IN terminal of PLL 80 is coupled through a 1 nF capacitor to pin 5 of receiver chip 44. The DSC IN terminal of PLL 80 is also coupled through a 1 MΩ resistor to the DSC OUT terminal of PLL 80. PLL 80 illustratively is a Motorola type MC145170D1 PLL IC. $\mu$P 82 illustratively is a Motorola type MC68HRC705KJ1 $\mu$P IC. Varactor diode 125 illustratively is a type MMBV409LT1 varactor diode.

The output audio from pin 17 of receiver chip 44 is coupled to the emitter of a transistor 130. The collector of transistor 130 is coupled through the series combination of a 3.3 KΩ resistor 132 and 0.1 $\mu$F capacitor 134 to ground. The audio signal at the common terminal of resistor 132 and capacitor 134 is coupled through a series RC circuit including a 0.022 $\mu$F capacitor 136 and a 5.6 KΩ resistor 138 to the base of a transistor 140. The emitter of transistor 140 is coupled to ground. Audio signal appearing on its collector is coupled through a 10 nF capacitor to the input terminal, pin 4, of audio amplifier chip 90. Bias for transistor 140 is provided through series 4.7 KΩ, 100 KΩ and 47 KΩ resistors 144, 146, 148 coupled between VEE and ground. The collector of transistor 140 is coupled to the common terminal of resistors 144, 146. The base of transistor 140 is coupled to the common terminal of resistors 146, 148. A 1 nF feedback capacitor is coupled between the collector and base of transistor 140. The output terminals, pin 5 and 8, of audio amplifier chip 90 are coupled to the terminals of a loudspeaker 150, illustratively a 32 Ω speaker. Pin 8 is coupled through one terminal of a miniature 2.5 mm multifunction jack 152 which, when used, opens the circuit between pin 8 and its respective terminal of loudspeaker 150. The sleeve of jack 152 is coupled to pin 5 of audio amplifier chip 90 through a 100 Ω resistor and a 10 $\mu$F, 16 V capacitor. Audio amplifier chip 90 illustratively is a Philips type TDA8551T audio amplifier IC. Transistor 140 illustratively is a type MMBT4124 transistor.

Power for scanner 20 is provided from a 9 VDC battery 160 through a diode 161 to an input terminal of a 5 VDC regulator integrated circuit 162. The voltage at the input terminal of regulator 162 is also coupled through an 18 KΩ resistor to the emitter of a regulator transistor 164. The battery voltage is also coupled through a diode 166 to the emitter of a regulator transistor 168. A 100 $\mu$F, 10 VDC capacitor is coupled across the input terminal of regulator 162 and its common terminal, system ground. A 10 $\mu$F, 16 VDC capacitor is coupled across the output terminal of regulator 162 and system ground. The output terminal of regulator 162 is coupled through diodes to the VDD terminal of $\mu$P 82 and the base of transistor 164. The emitter of transistor 164 is coupled to its base through a 100 KΩ resistor. The collector of transistor 164, which forms the scanner 20's notLOWBATTery terminal, is coupled through a 100 KΩ resistor to ground and through a 22 KΩ resistor to the base of transistor 130.

The collector of a transistor 170 is coupled through a 100 KΩ resistor to the base of transistor 164. The emitter of transistor 170 is coupled to ground. The base of transistor 170 is coupled through a 100 KΩ resistor to the notON/OFF terminal of $\mu$P 82. The collector of transistor 170 is coupled through a 10 KΩ resistor to the base of a transistor 172. The emitter of transistor 172 is coupled to the output terminal of regulator 162. The collector of transistor 172 is coupled through a 1 KΩ resistor to the base of a transistor 1 74. The emitter of transistor 174 forms the scanner 20's VCC supply, The collector of transistor 174 is coupled to the base of transistor 168. The collector of transistor 168 is coupled to the emitter of transistor 174. The sleeve of headphone jack 152 is coupled through a diode to the+terminal of battery 160 and through a 10 KΩ resistor to the emitter of a transistor 176. The base of transistor 176 is coupled to the scanner 20's VSS terminal. The collector of transistor 176 is coupled to the base of a transistor 178, and to ground through a 47 KΩ resistor. The collector of transistor 178 is coupled to the ungrounded terminal of CHannel/PROGram switch 88. The CHannel/PROGram terminal of $\mu$P 82 is coupled through a diode to the ungrounded terminal of switch 88 and through a 10 KΩ resistor to the VDD terminal of $\mu$P 82. The IRQ terminal of $\mu$P 82 is coupled through a diode to the ungrounded terminal of switch 88 and through a 10 KΩ resistor to the VDD terminal of $\mu$P 82. The Received Signal Strength Indicator terminal of $\mu$P 82 is coupled to pin 16 of receiver chip 44. The MODE terminal of $\mu$P 82 is coupled to the MODE terminal of audio amplifier chip 90. Transistors 170, 174 and 178 illustratively are type MMBT4124 transistors. Transistors 164, 172 and 176 illustratively are type MMBT4126 transistors. Transistor 168 illustratively is a type 2N4403 transistor. Regulator IC 162 illustratively is a Motorola type MC78FC50HT1 regulator IC.

This receiver configuration includes multifunction jack 152 which provides access to the scanner 20 electronics for earphone, battery 160 charging and programming the $\mu$P 82. Switch 88 is a multifunction switch which can be used for programming, mode selection and channel changing. Switch 86 replaces a potentiometer as a push and hold volume control. The crystal 52 and 10.7 MHZ crystal filter 50 are mounted on the rear of the circuit board of scanner 20 in back-to-back configuration to reduce mechanical shock sensitivity. The circuit board has a dual artwork layout to permit either surface mount technology or dual in-line package technology to be implemented for the $\mu$P 82. "Tombstone" or "hairpin" leaded capacitors are used throughout the circuit to reduce the problem of microphonics in the scanner 20.

Exhibit A attached hereto is a listing of the source code for $\mu$P 82. This code causes the scanner 20 to produce aural beeps of the digits of the tuned frequency. Multiple frequency acknowledgment tones are produced during channel frequency entry. Multiple pushbutton clicks are used to program frequency. Multiple beeps are also used during programming as an error indicator. Programming can be reset by pushing and holding the Channel/PROGram switch 88 for two seconds, followed by reprogramming. The scanner 20 can switch back and forth between two programmed channels or scan all seven weather radio channels, providing an unusual and convenient scanner format. It covers the frequency range from 140 MHZ to 170 MHZ, with a 10.7 MHZ IF. An internal 9 V battery 160 supplies the power for the scanner 20 through two pressure contacts. The battery is typically an alkaline unit, but may be any suitable 9 V package. A nickel-cadmium battery and associated charger are available if it is desired to recharge the battery 160 while it is in the radio. An alkaline battery will operate the scanner 20 for approximately twenty-four hours of normal use. A frilly charged nickel-cadmium battery will operate the unit for about five hours. When the battery 160 voltage is low, the scanner 20 will beep twice every five minutes until the scanner 20 shuts down. If the unit is permitted to operate until is shuts down due to low battery 160 voltage, the channel program information may be lost and may have to be reentered after a new battery is installed, or the rechargeable battery is recharged. To install a new battery, the scanner 20 is turned off before the old battery 160 is removed. Otherwise, the channel program information will be lost and will have to be reentered after a new battery is installed.

A nickel-cadmium battery charger (not shown) has a voltage and current limited output. The nickel-cadmium charger is powered by 120 VAC and supplies charging current through the earphone jack 152. The center conductor of the plug on the charger output cable is negative. The maximum open circuit voltage at the output is limited to about 10.7 VDC. The charging current flows through diodes 220 and 222 before flowing through battery 160, limiting the maximum voltage available to the battery 160 to about 9.3 V. However, an internal current limiting resistor reduces this voltage to about 8 V with a 2 mA trickle current. A red LED on the charger indicates when the scanner 20's battery 160 is being charged. If the LED is not lighted when the charger is plugged in, then either 120 VAC is not present, or the nickel-cadmium battery is not installed, or the nickel-cadmium battery is fully charged. When the charger is operating properly, the LED goes from bright to dim when the charging is approximately 90% complete. This occurs at about 7.8 VDC on the battery. The LED goes out when the battery is fully charged. The recharge time for a completely discharged battery is about sixteen hours. The battery charger will not operated properly with any battery other than a nickel-cadmium battery. The scanner 20 must be turned off while the battery is charging.

Protection against reverse connection of the battery is provided by diodes 161 and 166. A low battery detection circuit is made up of the 18 KΩ resistor in the emitter circuit of transistor 164, the 100 KΩ resistor in the emitter-base circuit of transistor 160, the 100 KΩ resistor between the base of transistor 164 and the collector of transistor 170, transistor 164, the 100 KΩ resistor between the collector of transistor 164 and ground, and the diode between the output of regulator 162 and the base of transistor 164. This circuit is activated by the $\mu P$ 82 when the $\mu P$ 82 turns transistor 170 on. If the voltage across the input and ground of regulator 162 is greater than about 6 V, transistor 164 is turned on and applies a maximum voltage of about 5 V DC to pin 9 of $\mu P$ 82. If the voltage across the input and ground of regulator 162 is less than about 6 V, the voltage on pin 9 of $\mu P$ 82 drops until, at an applied voltage across the input and ground of regulator 162 of 5.5 V, the voltage on pin 9 of $\mu P$ 82 is essentially 0 V. This voltage is used by the $\mu P$ 82 to determine when to generate the low battery indication noted above, double beeps about every five minutes.

The battery 160 voltage is filtered by the 100 $\mu F$, 10 V capacitor across the input and ground of regulator 162. It is further regulated and filtered by regulator 162 and the 10 $\mu F$, 16 V capacitor across the output of regulator 162 and ground. This voltage is the 5 V regulated voltage (5R) for the rest of the scanner 20 circuitry. When transistor 170 is turned on by the $\mu P$ 82, transistor 172 is turned on through the 10 KΩ resistor coupled between the collector of transistor 170 and the base of transistor 172. The voltage on the collector of transistor 172 is thus a 5 V switched voltage and forms the 5 V switched (5S) voltage for the remainder of the circuitry of scanner 20. The battery voltage supplied through diode 166 forms the 9 VDC source for the remainder of the circuitry of scanner 20. This output also supplies the power for audio amplifier chip 90. A power switch circuit including the 10 KΩ resistor between the emitter and base of transistor 168, the 100 pF capacitor between the collector and base of transistor 174, the 1 KΩ resistor between the base of transistor 174 and the collector of transistor 172, and transistors 168 and 174 is turned on by the 5S power applied through the 1 KΩ resistor between the base of transistor 174 and the collector of transistor 172. The output of this power switch is regulated at 4.3 VDC and is supplied to the audio amplifier chip 90 (4.3S).

The $\mu P$ 82 controls all of the scanner 20's functions. $\mu P$ 82 obtains its operating power from the 5R voltage through the diode between regulator 162 and the VDD pin of $\mu P$ 82. This power is filtered by a 330 $\mu F$, 10 V capacitor coupled across the VDD and GrouND pins of $\mu P$ 82. This 330 $\mu F$, 10 V capacitor also keeps $\mu P$ 82's RAM intact for two minutes or more during changing of the battery 160, so that the programming information for channels 1 and 2 is less likely to be lost during changing of the battery. The scanner 20 is turned on and off by sequential activation of the ON/OFF button 84. Activation of button 84 applies a RESET signal to pin 1 of $\mu P$ 82. If the scanner 20 is off before the button 84 is pressed, it is on after. If the scanner 20 is on before the button 84 is pressed, it is off after. When the $\mu P$ 82 is turned on, an internal oscillator coupled to pins 2 and 3 of the $\mu P$ 82 provides oscillations at the frequency of resonator 92. This signal forms the internal clock frequency of $\mu P$ 82. Pins 4 and 5 of $\mu P$ 82 are used to control the channel 1 and channel 2 LEDs 96 and 98, respectively, on the top panel of the scanner 20. The signals on these pins are amplified by transistors 100 and 102, respectively, to drive LEDs 96 and 98 through respective 1 KΩ current limiting resistors.

Pin 8 of $\mu P$ 82 is the system ON/OFF terminal. Pin 9 is a multipurpose I/O terminal. When configured as an input, it is used to monitor the output of the low battery circuit. When configured as an output in the receive mode, it controls the audio output from the receiver chip 44 through the 22 KΩ resistor in the base of transistor 130, transistor 130 and the 3.3 KΩ resistor in the collector of transistor 130. This provides the squelch function for the scanner 20. In the PLL programming mode, pin 9 of $\mu P$ 82 is used in conjunction with pins 10 and 11 of $\mu P$ 82 to program the functions of the PLL chip 80. In this mode, pin 9 outputs the clock signal for programming the PLL chip 80. Pin 10 of $\mu P$ 82 is used by the $\mu P$ 82 to enable PLL chip 80 programming. Pin 11 of $\mu P$ 82 additionally provides the following functions. When the scanner 20 is in the PLL 80 programming mode, pin 11 is used to send the DATA signal to the PLL 80. When the scanner 20 is in the channel programming mode, pin 11 is configured as an input. The voltage on pin 11 determines whether the scanner 20 is a standard consumer scanner, in which case pin 11 is at 0 V, or whether scanner 20 is a commercial kiosk device, in which case pin 11 is at 5 V. Finally, in the receive mode, pin 11 of $\mu P$ 82 is used to send the various beep signals to the audio preamplifier transistor 140 through the series 0.1 $\mu F$ capacitor, 47 KΩ resistor, capacitor 136 and resistor 138 in the base circuit of transistor 140.

Pin 12 of $\mu P$ 82 is used as an input to monitor the Received Signal Strength Indicator voltage from pin 16 of receiver chip 44. The voltage level at pin 12 of $\mu P$ 82 determines whether the signal from the receiver chip 44 is activated or squelched. Below 2.5 VDC, the output is squelched, or turned off. At and above 2.5 VDC, the signal is applied to the audio preamplifier 140 circuitry. Pin 13 of μP 82 controls the operating mode of the audio power amplifier 90 by controlling the voltage on pin 2 of audio power amplifier 90. If pin 13 of μP 82 is configured as an input, or "floated," the audio power amplifier is muted. If pin 13 of μP 82 is configured as an output and held low, the audio power amplifier 90 is activated. Pin 14 of μP 82 controls the gain of the audio powere amplifier 90 by sending digital pulses to pin 1 of the audio power amplifier 90. Positive-going pulses from about 2.5 VDC to 5 VDC increase the volume about 1 bB per pulse. Negative-going pulses from about 2.5 VDC to 0 VDC decrease the volume by about 1 bB per pulse. The pulses are generated at a rate of about 4 pulses per second when the IRQ input on pin 16 of the μP 82 is low and pin 15 of the μP 82 is high. The polarity of the pulses changes each time the volume button 86 is pressed. Therefore, if the volume increases the first time the button 86 is pressed, it will decrease the next time, and vice versa. This permits button 86 both to increase and decrease the volume.

If pin 15 of μP 82 is low when pin 16 of μP 82 is low, the volume is not changed. Instead, when both pins 15 and 16 are high, the operating state of the scanner 20 is changed. There are four states. Weather monitor is the default state when the scanner 20 is turned on. The scanner 20 scans all seven NOAA VHF weather frequencies and locks onto the first one it finds. When the scanner 20 is in this mode, both LEDs 96 and 98 blink simultaneously. The first state after the weather monitor state is channel 1. The scanner 20 recovers the frequency information for channel 1 from the μP 82's RAM and programs the PLL 80 to tune channel 1's frequency. When the scanner 20 is in this mode, LED 96 blinks. The second state after the weather monitor state is channel 2. The scanner 20 recovers the frequency information for channel 2 from the μP 82's RAM and programs the PLL 80 to tune channel 2's frequency. When scanner 20 is in this mode, LED 98 blinks. The third state after the weather monitor state is "scan channels 1 and 2." This state sequentially programs the PLL 80 to receive first channel 1 and then channel 2 at a rate of about six channel changes per second. The channel 1 and 2 LEDs 96 and 98 blink alternately in this mode. If a signal is detected on either channel 1 or 2, the scanner 20 locks onto the channel and the LED for the active channel is activated continuously. When the signal disappears, the scanner 20 waits about a half second or so before returning to scan mode.

The scanner 20's reference oscillator and second local oscillator are the same circuit. This circuit is built around an amplifier in receiver chip 44 connected to pins 5 and 6 thereof. The 3.3 KΩ resistor between pin 5 of receiver chip 44 and ground is provided to increase the current in this amplifier. This is done to generate the required level to drive the oscillator input of the PLL chip 80. The external components of the oscillator include the 10.245 MHZ crystal 52, the 47 pF and 56 pF feedback capacitors across pins 5 and 6 and across pin 5 and ground, respectively, and the frequency adjusting capacitor 68. This circuit is trimmed to within 10 Hz or so of the 10.245 MHZ crystal 52 frequency during setup. The output of this circuit is the reference for the PLL circuit 80. It is also the second local oscillator for the dual conversion receiver circuit including receiver chip 44.

The PLL 80's purpose is to control the frequency of the voltage controlled oscillator including an amplifier internal to receiver chip 44. 5 VDC power for the PLL 80 is applied to pin 16 of PLL 80 after being filtered by parallel 330 OF, 10 V and 0.1 μF capacitors on its VDD input, pin 16. Ground, VSS, is coupled to pin 12 of PLL 80. The reference frequency for the PLL 80 is derived from the 10.245 MHZ oscillator in the receiver chip 44. The signal from pin 5 of the receiver chip is coupled to pin 1 of the PLL 80 through a 1 nF capacitor. A 1 MΩ resistor and pin 2 of the PLL 80 provide bias voltage for the internal amplifier coupled to pins 1 and 2 of PLL 80. Pin 4 of the PLL 80 is the input terminal for the signals from the VCO in receiver chip 44. The 1 nF capacitor between inductor 110 and pin 4 of PLL 80 provides DC isolation of the signal from inductor 110. Pins 5, 6 and 7 are the PLL 80 programming input pins. When pin 6 is held low, the other pins are enabled for programming. Data is input on pin 5. It is clocked into the chip by the positive-going edges of the signal on pin 7. The VCO control voltage is output on pin 13 of PLL 13. Before being applied to the VCO network, it is filtered and shaped by the PLL loop filter including resistor 106, resistor 124, the 2.2 μF, 50 V capacitor to ground, capacitor 108, resistor 109 and the 10 nF capacitor to ground. The 10 nF capacitor to ground also functions as a bypass capacitor for the VCO RF signal. The 10 nF capacitor to ground and capacitor 108 are stood on end, or "tombstoned," and connected to the PC board on which the bulk of the scanner 20 circuitry is mounted at one end thereof by a short length of very small bus wire. This reduces the likelihood that the piezoelectric properties of the ceramic surface mount capacitors will cause feedback oscillations through the VCO due to vibrations from the sound from the speaker 150.

The VCO is built around an internal amplifier in the receiver chip 44. This amplifier is between pins 1 and 2 of receiver chip 44. Resistor 64 is used to increase the current in the amplifier to enhance its high frequency performance. Capacitor 60 and the 1 nF capacitor between inductor 110 and resistor 64 are DC blocking capacitors to isolate the VCO control voltage from the bias voltages of the amplifier. The resonator circuit includes the varactor diode 62 and inductors 110 and 112. The ratio between the values of inductors 110 and 112 determines the feedback coefficient to the amplifier. The tap on inductor 110 determines the output from the VCO to the PLL 80. Both inductors are printed on the PC board artwork and are fixed tuned. The overall circuit tunes from about 130 MHZ to about 160 MHZ with a voltage change from about 1 VDC to about 4 VDC. This is sufficient to tune the radio from about 140 MHZ to about 170 MHZ, taking into account the IF offset.

The signal to be recovered by the scanner 20 is picked up by a built-in, non-removable, helical wound antenna 22. A broadband input tuning network 26, 28 is used to couple the input signal to the emitter of transistor 30. This input network is fixed tuned to about 155 MHZ with a 1.5 dB bandwidth of 30 MHZ. Inductor 28 is printed on the PC board. Transistor 30 is DC biased by resistors 34 and 36. Capacitor 32 is an RF bypass capacitor that grounds the base of transistor 30. Resistor 38 and capacitor 39 decouple the input power to the amplifier 30 from the 5S supply. The amplifier 30 output is coupled through resistor 40, which reduces parasitic oscillations, to a track tuned filter comprising inductor 46 and varactor diode 125 with auxiliary components capacitor 120 (a DC blocking capacitor) and resistor 122 (an RF blocking resistor). This filter tracks the tuning of the VCO by using the same control voltage as the VCO. It is nominally tuned 10.7 MHZ above the VCO frequency by slug-tuned inductor 46. The amplified signal out of the track tuned filter 46, 125 is coupled to the input, pin 22, of the receiver chip 44 through capacitor 42.

The receiver chip 44 is a multifunctional device which includes first and second local oscillators, two balanced mixers, two IF amplifiers, a quadrature detector, an RSSI generator and a general purpose amplifier. It is powered from the 5S supply through a filter including the series 100 Ω resistor and parallel-coupled 100 μF, 6.3 V capacitor and capacitor 78. Power is applied to pins 4 and 19 of receiver chip 44 with the ground return coupled to pins 8 and 23 thereof. RF and IF bypass capacitors for the internal circuitry of receiver chip 44 include the 0.1 μF capacitor across pin 4 and ground, the 0.1 μF capacitor across pin 10 and ground, the 0.1 μF capacitor across pins 10 and 11, and the 0.1 μF capacitor across pin 23 and ground.

The RF input signal from the RF amplifier 30 and the output of the VCO are combined in the first balanced mixer. The difference frequency, the first IF, at 10.7 MHZ is sent to a two-pole crystal filter 50, through an impedance matching resistor 56. The filter has a −3 dB bandwidth of 15 KHz. The 3.3 KΩ resistor on pin 18 of receiver chip 44 loads the output of the filter 50. The 10.7 MHZ output of crystal filter 50 is mixed in a second balanced mixer with the 10.245 MHZ second local oscillator signal to give a difference frequency of 455 KHz. This signal is provided at pin 7 of the receiver chip 44 to the four-pole, 455 KHz ceramic bandpass filter 54. Filter 54 also has a 15 KHz bandwidth. After filtering, the signal is returned to the receiver chip 44 at pin 9. The 455 KHz signal is then amplified and supplied through pin 13 to a quadrature coil 70. Resistor 74 helps control the bandwidth of the quadrature detector circuit. The recovered audio signal is output on pin 17 of receiver chip 44. The 455 KHz signal is also used internally to generate a DC signal proportional to the logarithm of the signal level. This signal, on pin 12 of the receiver chip 44, is called the Received Signal Strength Indicator. The 0.1 μF capacitor on pin 12 helps filter noise out of the RSSI signal.

The RSSI signal is amplified by an internal amplifier coupled to pins 15 and 16 of receiver chip 44. Resistor 76 provides operating current to this amplifier. The parallel combination of the 100 KΩ resistor and 0.1 μF capacitor across pins 15 and 16 and the 4.7 KΩ resistor across pin 15 and ground determine the amplifier gain and bandwidth. The series 56 KΩ resistor to the voltage supply determines the RSSI threshold level at which the amplifier becomes operational. The 1 nF capacitor from pin 16 to ground is an RF bypass capacitor that suppresses spurious emissions from the receiver chip 44 on the RSSI conductor. The output of the RSSI amplifier on pin 16 is sent to pin 12 of the μP 82 which then uses that output to determine when the signal is strong enough to be useable. The typical switching point occurs at about 10 dB SINAD.

Before the signal from the receiver chip is applied to the audio power amplifier, it is amplified and its frequency characteristics are modified to enhance the intelligibility of the signal. Frequencies below about 400 Hz are attenuated to reduce the level of subaudible signaling tones and digital ID codes. Frequencies above 3 KHz are attenuated to reduce high frequency noise and feedthrough of the 5 KHz PLL reference signal. The audio preamplifier is composed of a low pass filter including resistor 132 and capacitor 134, a high pass filter including capacitor 136 and resistor 138, amplifying transistor 140, a high frequency suppression filter including resistor 146 and its parallel 1 nF capacitor, and a high pass filter including the 0.01 μF capacitor between the collector of transistor 140 and pin 4 of audio amplifier 90 and a 20 KΩ resistor internal to audio amplifier 90.

Power is supplied to the audio power amplifier 90 from the scanner 20's 4.3s line, filtered by parallel 330 μF, 10 V and 0.1 μF capacitors coupled across pins 6 and 7 of audio power amplifier 90. The 10 μF, 16 V capacitor across pin 3 of audio amplifier 90 and ground is a bypass for the internal bias circuitry of the audio amplifier 90. Pin 1, the volume control for the audio amplifier 90 is internally biased at about the midpoint between the voltage on pin 6 and the voltage on pin 7. The gain of the chip is controlled by pulsing pin 1 to the supply voltage to increase the gain or to ground to decrease the gain. Each pulse changes the gain by about 1 bB. The series 220 KΩ resistors coupled between 4.3S and ground provide a midpoint bias voltage for the MODE control on pin 2. If pin 2 is driven to the supply voltage, the chip will enter a shutdown mode with only a few microamperes of current drain. If pin 2 is floating at about the midpoint between the supply and ground, the amplifier 90 will be in the MUTE mode in which the outputs are biased and ready, but no signal will be output. This is the mode normally used while in the receive condition with no signal present. If pin 2 is taken below 1 VDC, the amplifier 90 is fully on and operational. Pins 5 and 8 drive the speaker 150 through the earphone jack 152. If an earphone is plugged into the jack 152, the speaker 150 is disconnected and the audio is fed to the earphone through a series 10 μF, 16 V capacitor and 100 Ω resistor. The earphone jack is also used as an input jack for the nickel-cadmium battery charger and as the input for an external channel programmer or charger/programmer. The 1 nF capacitor across pin 8 and ground is an RF bypass to keep spurious signals from being radiated from the earphone, charger or programming cords.

The user may program channels 1 and 2 of the scanner 20 to any standard frequency between 140 MHZ and 169.995 MHZ using the CH/PROG switch 88. The channel spacing is 5 KHz. The μP 82 approximates 12.5 KHz channels by tuning the scanner 20 2.5 KHz above the entered channel frequency. The 15 KHz bandwidth of the scanner 20 accommodates this offset with minimal added distortion. When the scanner 20 first enters the channel-programming mode, it configures pin 11 of μP 82 as an input. It then looks at the DC voltage on pin 11. If the voltage is less than 2.5 VDC, channel programming is initiated after pin 15 is held low for at least 1.5 seconds. However, if the 100 KΩ resistor between 5S and pin 11 has been installed in the scanner 20, and the voltage is greater than 2.5 VDC, channel programming will not proceed unless pin 15 is held low for at least 30 seconds. This is called the "kiosk" mode and applies to units that are rented out preprogrammed to particular frequencies, for example, at sporting events. The purpose for this additional delay is to provide some measure of protection against accidental or intentional patron reprogramming of these kiosk units.

Programming is accomplished by pressing and releasing the CH/PROG switch 88 until the scanner 20 is at the channel number to be programmed. Note that programming cannot be accomplished in the weather monitor or scan modes. Once the scanner 20 is set to the channel to be programmed, the channel switch is depressed and held until the unit beeps once, about 1.5 seconds in the consumer version and about 30 seconds in the kiosk version. The button is then released and within the next 2 seconds should be depressed and released once. This will input a "1" to the scanner 20. This represents the first digit of the frequency to be programmed, which must be between 140 MHZ and 169.955 MHZ. About two seconds after the button is released, a dual tone "OK" beep will be generated that indicates the digit has been accepted. If anything other than a "1" was entered, five beeps will be generated indicating that an invalid number was input. The programmer then has another two seconds to enter a "1." If nothing is input within this two seconds, another single beep is generated and the scanner 20 returns to the original frequency.

After the scanner 20 has accepted a "1" as the first digit, it generates an "OK" beep and waits two seconds for the second digit which must be a four, a five or a six. Any other digit will cause the unit to generate the five beep error signal and wait two seconds for a correct entry. If no correct entry is received, the unit returns to the original frequency. If a 4, a 5 or a 6 is entered, the scanner 20 beeps "OK" and waits two seconds for the next digit which may be anything from zero through nine. A "0" is input by doing nothing. For the third, fourth, fifth and sixth digits, no input is interpreted as a zero. When programming the sixth digit, only a zero, two, five or seven will be accepted. It is not necessary to program the seventh digit for a 12.5 KHz channel. It is inferred to be a five by the $\mu$P 82 if the sixth digit is two or seven. It may be programmed if desired, but the $\mu$P 82 will ignore it. The second timer is reset each time the button 88 is pressed and released. Thus, the button 88 can be operated at a very slow rate. On the other hand, the button 88 can be pressed and released practically as fast as the programmer wishes. After the last digit has been accepted, the scanner 20 repeats the frequency it has received by beeping out the stored digits. One beep means 1, two beeps mean 2, and so on. A zero is indicated by generating 10 beeps. After repeating the frequency, the scanner 20 beeps once, programs the PLL 80 and retunes itself to the new frequency.

The scanner 20 may be programmed externally using a computer and the optional programmer or charger/programmer. Both of these connect through the earphone jack 152 and to an IBM compatible PC by means of a serial port. A 120 VAC power cube power supply powers the programmer and charger/programmer. The software program to control the charging and/or programming is included with the programmer and charger/programmer on a 3-½" floppy disk. The programming pulses are regulated to about 6.8 VDC. After the voltage drop in diode 222, the remaining voltage is about 6.1 VDC. This is too low to cause any battery charging through diode 220, but it is large enough to exceed the emitter turn-on voltage of transistor 176, which, with the base of transistor 176 connected to 5R is about 5.6 VDC. The 0.5 volt remaining across the 10 K$\Omega$ resistor in series with the emitter of transistor 176 generates a 50 $\mu$A current that flows from the collector of transistor 176. This current is supplied to the base of transistor 178. Transistor 178 turns on, pulling the high side of switch 88 to ground, mimicking a CH/PROG button 88 push. The 10 K$\Omega$ resistor in the emitter circuit of transistor 176 ensures that transistor 178 is normally completely turned off. The 0.1 $\mu$F capacitor between the collector of transistor 178 and ground suppresses any short electrostatic pulses on the earphone jack 152.

The software asks for the two channel frequencies to be programmed. Then it tells the operator to put the scanner 20 into the weather scan mode. After that, the operation proceeds automatically until the programming is complete. The total elapsed time for programming will generally be less than about two minutes. The multiple unit charger/programmer includes built-in, nickel-cadmium battery charging circuitry. This device will charge and program up to 10 units simultaneously. Add on modules can expand the capability up to 50 units in 10 unit increments. For charging nickel-cadmium batteries installed in the scanners 20, the scanners 20 are connected to the charger and the CHARGE control switch is turned on. It is necessary to ensure that the scanners 20 have been turned off before charging is attempted. The external programmer and charger/programmer are intended primarily for kiosk operations.

This receiver may also incorporate an integral FM short range low power transmitter of the variety found in products operating within the U.S. domestic Family Radio Service. Such a transmitter illustratively can be of the direct FM modulation type, including modulating limiter/filter, audio amplifier, power amplifier, antenna switching and coupling circuits typical of those found in the Family Radio Service, but not found in scanning/weather receivers. The transmitter output frequency can be controlled by the microprocessor and phase lock loop circuits, with RF power output and FM deviation under no circumstances exceeding FCC specifications for transmitters of this type. Frequencies of transmitted output are those specified for use by the Family Radio Service (or other authorized "license free" service). Transmitter shall be keyed by either a push-to-talk or voice-activated circuit, and will be audio limited within FCC specified parameters regarding pre-emphasis and deviation bandwidth limits. Filters shall be incorporated to ensure that no emission exceeds the limits for any radiated or conducted RF emission including subharmonic and harmonic output. All circuitry will conform to current FCC rules and regulations, and will be approved by the FCC or its representative under CFR Title 47.

What is claimed is:

1. Apparatus including a receiver circuit, a microprocessor, an input/output (I/O) port, at least one switch for configuring the I/O port, the at least one switch coupled to the microprocessor, an audio amplifier coupled to the receiver circuit and to the I/O port, an audio frequency transducer coupled to the I/O port, and a power supply coupled to the I/O port, the receiver, the microprocessor, the at least one switch, and the audio amplifier, the audio frequency transducer being selectively coupled to the audio amplifier through the I/O port, and the power supply being selectively coupled to the I/O port, to permit activation of the audio frequency transducer by a signal coupled from the audio amplifier through the I/O port and access to the power supply through the I/O port.

2. The apparatus of claim 1 further including a circuit board having two sides onto which components of the apparatus are mounted, the components including at least two crystals, the crystals mounted to one of the sides of the circuit board to reduce the sensitivity of the apparatus to mechanical shock.

3. The apparatus of claim 1 further including a circuit board, the circuit board including a circuit layout for a first complement of components of the apparatus and a second circuit layout for a second complement of components of the apparatus.

4. The apparatus of claim 1 including circuit components having two electrical leads, at least some of the circuit components having two electrical leads being oriented in the apparatus with their two leads adjacent each other to reduce circuit noise.

5. The apparatus of claim 1 wherein the microprocessor is programmed to cause the apparatus to produce an audible indication by the transducer of at least one of: a change of state of the apparatus; and, a command to the apparatus.

6. The apparatus of claim 1 capable of selectively receiving at least two different carrier frequencies.

7. The apparatus of claim 1 wherein the microprocessor monitors the power supply output voltage and produces an audible indication by the transducer when the power supply output voltage does not exceed a predetermined threshold.

8. The apparatus of claim 1 wherein the power supply is selectively coupled to the I/O port to permit recharging of the power supply through the I/O port.

9. The apparatus of claim 8 further including an indicator for indicating when the power supply has been recharged to a predetermined level.

10. The apparatus of claim 9 further including a circuit for protecting contents of the microprocessor when the power supply falls below a predetermined threshold.

11. The apparatus of claim 1 wherein the audio amplifier includes a gain control port, the gain of the audio amplifier being increased by input signals of a first polarity provided to the gain control port and decreased by input signals of a second polarity provided to the gain control port.

* * * * *